United States Patent
Tokita

(10) Patent No.: US 10,769,816 B2
(45) Date of Patent: Sep. 8, 2020

(54) THERMAL IMAGE PROCESSING DEVICE, INFRARED IMAGING APPARATUS, THERMAL IMAGE PROCESSING METHOD, AND THERMAL IMAGE PROCESSING PROGRAM

(71) Applicant: JVC KENWOOD Corporation, Yokohama-shi, Kanagawa (JP)

(72) Inventor: Shigetoshi Tokita, Yokohama (JP)

(73) Assignee: JVCKENWOOD CORPORATION, Yokohama-Shi, Kanagawa (JP)

(*) Notice: Subject to any disclaimer, the term of this patent is extended or adjusted under 35 U.S.C. 154(b) by 0 days.

(21) Appl. No.: 16/367,028

(22) Filed: Mar. 27, 2019

(65) Prior Publication Data

US 2019/0221004 A1 Jul. 18, 2019

Related U.S. Application Data

(63) Continuation of application No. PCT/JP2017/037964, filed on Oct. 20, 2017.

(30) Foreign Application Priority Data

Jan. 31, 2017 (JP) .................................. 2017-015158

(51) Int. Cl.
*G06T 7/80* (2017.01)
*B60R 11/04* (2006.01)
(Continued)

(52) U.S. Cl.
CPC ................ *G06T 7/80* (2017.01); *B60R 11/04* (2013.01); *G01J 5/0025* (2013.01); *G06T 7/00* (2013.01);
(Continued)

(58) Field of Classification Search
CPC ... G06T 7/80; G06T 7/00; G06T 2207/30261; G06T 2207/10048; G06T 7/70;
(Continued)

(56) References Cited

U.S. PATENT DOCUMENTS

| 8,935,045 B2* | 1/2015 | Kim | ........................ G01D 9/005 340/436 |
| 2004/0075742 A1 | 4/2004 | Mekata et al. | |

(Continued)

FOREIGN PATENT DOCUMENTS

| EP | 1160550 A1 | 12/2001 |
| JP | 2007-201807 A | 8/2007 |

(Continued)

*Primary Examiner* — Fernando Alcon
(74) *Attorney, Agent, or Firm* — Procopio, Cory, Hargreaves & Savitch LLP

(57) ABSTRACT

A thermal image processing device includes a thermal image acquiring unit configured to acquire a thermal image detected by an infrared detector provided in a vehicle, an object detecting unit configured to detect an object from the thermal image, a positional relationship calculating unit configured to calculate a positional relationship between the detected object and the vehicle and to calculate a change in the positional relationship, and a determining unit configured to determine whether to calibrate the infrared detector on the basis of the change in the calculated positional relationship.

7 Claims, 6 Drawing Sheets

(51) Int. Cl.

| | | |
|---|---|---|
| *H04N 5/33* | (2006.01) | |
| *G01J 5/00* | (2006.01) | |
| *G08B 21/00* | (2006.01) | |
| *G08G 1/16* | (2006.01) | |
| *H04N 5/232* | (2006.01) | |
| *G08B 25/00* | (2006.01) | |
| *H04N 7/18* | (2006.01) | |
| *G06T 7/00* | (2017.01) | |

(52) U.S. Cl.
CPC ............ *G08B 21/00* (2013.01); *G08B 25/00* (2013.01); *G08G 1/16* (2013.01); *H04N 5/232* (2013.01); *H04N 5/33* (2013.01); *H04N 7/18* (2013.01); *B60R 2300/8033* (2013.01); *B60R 2300/8093* (2013.01); *G01J 2005/0048* (2013.01); *G01J 2005/0077* (2013.01); *G06T 2207/30261* (2013.01)

(58) Field of Classification Search
CPC .......... G06T 5/007; G08B 21/00; G08B 1/16; G08B 25/00; H04N 5/232; H04N 7/18; H04N 5/33; H04N 17/002; H04N 5/23218; H04N 7/183; B60R 11/04; B60R 2300/8093; B60R 2300/8033; G01J 5/0025; G01J 2005/0077; G01J 2005/0048; G08G 1/166
See application file for complete search history.

(56) References Cited

U.S. PATENT DOCUMENTS

| | | | |
|---|---|---|---|
| 2005/0133709 A1 | 6/2005 | Mekata et al. | |
| 2006/0126899 A1* | 6/2006 | Nagaoka | B60K 35/00 |
| | | | 382/103 |
| 2013/0002874 A1 | 1/2013 | Negoro et al. | |
| 2014/0139685 A1* | 5/2014 | Nussmeier | H04N 5/2257 |
| | | | 348/164 |
| 2015/0091716 A1* | 4/2015 | Hathaway | B60Q 1/525 |
| | | | 340/435 |
| 2015/0189195 A1* | 7/2015 | Hamann | G01S 3/7861 |
| | | | 348/165 |
| 2015/0302735 A1* | 10/2015 | Geerlings | G08C 17/02 |
| | | | 340/5.25 |
| 2016/0223588 A1* | 8/2016 | Fox | G01R 31/58 |
| 2018/0137375 A1* | 5/2018 | Takemura | H04N 7/18 |
| 2018/0247421 A1* | 8/2018 | DeAngelis | G06K 9/00342 |
| 2018/0350100 A1* | 12/2018 | Hanson | G06F 16/487 |

FOREIGN PATENT DOCUMENTS

| | | | |
|---|---|---|---|
| JP | 2009-163506 A | | 7/2009 |
| JP | 2009-284224 A | | 12/2009 |
| JP | 2013105432 A | * | 5/2013 |
| WO | 2011/114624 A1 | | 9/2011 |

* cited by examiner

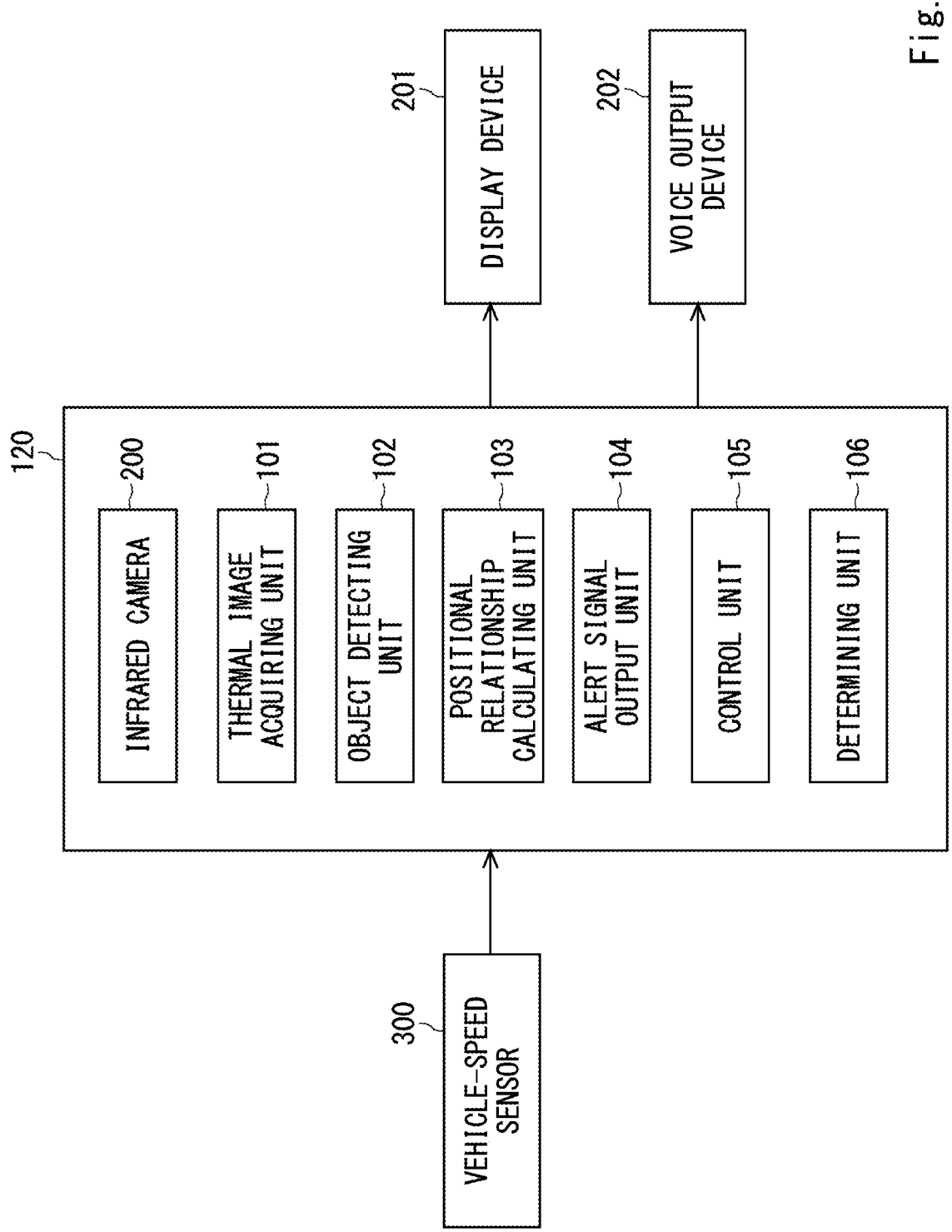

… (1)

THERMAL IMAGE PROCESSING DEVICE, INFRARED IMAGING APPARATUS, THERMAL IMAGE PROCESSING METHOD, AND THERMAL IMAGE PROCESSING PROGRAM

CROSS REFERENCE TO RELATED APPLICATION

The present application is a continuation of PCT/JP2017/037964 filed on Oct. 20, 2017, which is based upon and claims the benefit of priority from Japanese Patent Application No. 2017-015158, filed on Jan. 31, 2017, the disclosure of which are incorporated herein in its entirety by reference.

BACKGROUND

The present invention relates to thermal image processing devices, infrared imaging apparatuses, thermal image processing methods, and thermal image processing programs.

In recent years, a number of products that utilize an infrared camera provided with an infrared detector have been developed for security purpose or for use in mobile units. Infrared cameras detect heat in captured images and can thus detect humans and objects in an environment where no visible light is present, as in nighttime. The use of such a sensor in automobiles or the like, for example, makes it possible to detect humans or objects within a range which headlights do not reach at night. Then, the driver or the like is alerted to a possible human or object that may collide with the automobile or the like, thus helping to improve the safety of the automobile or the like.

Such infrared cameras are susceptible to influence of a change or the like in the environmental temperature, which causes their signals to deteriorate. Therefore, a measure is being taken to maintain a predetermined accuracy of the infrared cameras by calibrating output signals of the infrared cameras as appropriate. For example, an infrared imaging apparatus (Japanese Unexamined Patent Application Publication No. 2007-201807) includes a shutter that opens or closes an aperture for taking light into an infrared detector. The infrared imaging apparatus calculates an output value of each element of the infrared detector while the shutter is closed and also calculates an offset correction value of each element on the basis of the measured surface temperature of the shutter.

SUMMARY

The calibration method described in Patent Literature 1 is carried out while the shutter of the infrared camera is being closed. Therefore, while calibrating the infrared detector, the infrared imaging apparatus cannot detect a possible human or object that may collide with the automobile or the like. In other words, the infrared imaging apparatus cannot alert the driver to the possibility that the automobile may collide with a human or an object. Accordingly, the infrared imaging apparatus may have its function of ensuring safety of the automobile or the like reduced by carrying out the calibration.

A "thermal image" as used herein refers to an image that represents infrared radiation from an object in the form of a thermal distribution.

A thermal image processing device according to the present embodiments includes a thermal image acquiring unit configured to acquire a thermal image detected by an infrared detector provided in a vehicle, an object detecting unit configured to detect an object from the thermal image, a positional relationship calculating unit configured to calculate a positional relationship between the detected object and the vehicle and to calculate a change in the positional relationship, and a determining unit configured to determine whether to calibrate the infrared detector on the basis of the change in the calculated positional relationship.

Employing such a configuration allows the thermal image processing device to calibrate the infrared detector at an appropriate timing in accordance with the movement of a human or an object detected in the acquired thermal image.

A thermal image processing method according to the present embodiments includes acquiring a thermal image detected by an infrared detector provided in a vehicle, detecting an object from the thermal image, calculating a positional relationship between the detected object and the vehicle and calculating a change in the positional relationship, and determining whether to calibrate the infrared detector on the basis of the change in the calculated positional relationship. Thus, the thermal image processing method makes it possible to calibrate the infrared detector at an appropriate timing on the basis of the change in the calculated positional relationship.

A thermal image processing program according to the present embodiments causes a computer to execute a procedure of acquiring a temperature distribution detected by an infrared detector provided in a vehicle, a procedure of detecting an object from the temperature distribution, a procedure of calculating a positional relationship between the detected object and the vehicle and calculating a change in the positional relationship, and a procedure of determining whether to calibrate the infrared detector on the basis of the change in the calculated positional relationship. Thus, the thermal image processing program makes it possible to calibrate the infrared detector at an appropriate timing on the basis of the change in the calculated positional relationship.

The present embodiments can provide a thermal image processing device, a thermal image processing method, and a thermal image processing program that calibrate an infrared detector at an appropriate timing.

BRIEF DESCRIPTION OF THE DRAWINGS

FIG. 6 is a functional block diagram of an infrared imaging apparatus 120 according to a fourth embodiment.

DETAILED DESCRIPTION

First Embodiment

Hereinafter, a first embodiment of the present invention will be described with reference to the drawings. A thermal image processing device 100 according to the embodiment is mounted in an automobile. The thermal image processing device 100 detects an object by processing a signal of a thermal image acquired from an infrared camera 200 and notifies a driver when there is a possibility that a host vehicle may collide with the detected object as determined on the basis of a positional relationship between the host vehicle and the detected object and a change in this positional relationship.

Figure 1:
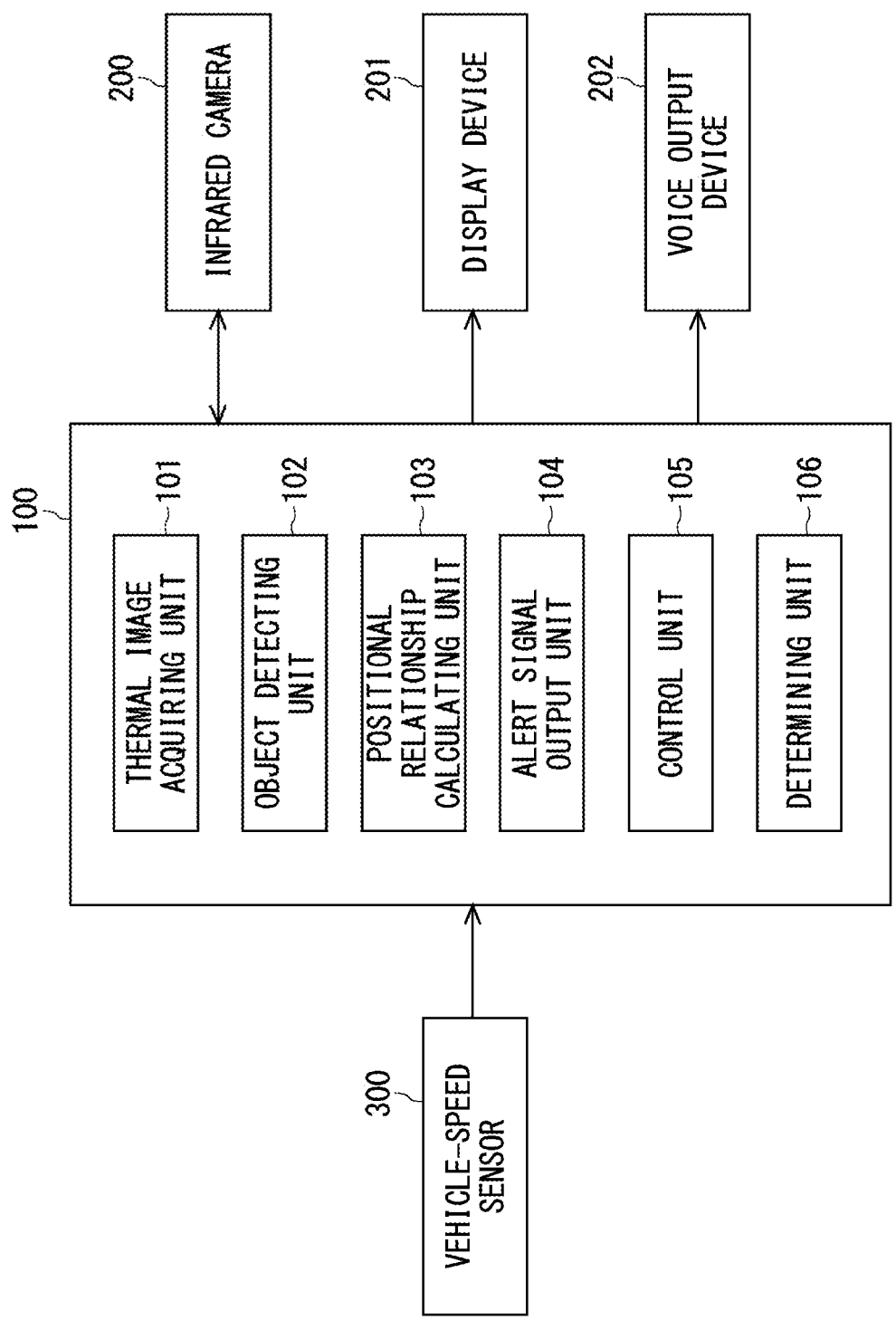
FIG. 1 is a functional block diagram of a thermal image processing device 100 according to a first embodiment.

FIG. 1 is a functional block diagram of the thermal image processing device 100 according to the embodiment. The thermal image processing device 100 is coupled to the infrared camera 200, a display device 201, and a voice output device 202. The thermal image processing device 100 is further coupled to an in-vehicle communication bus and receives information on the speed of the vehicle from a vehicle-speed sensor 300. The thermal image processing device 100 can also receive information on the host vehicle position or the like on the GPS (global positioning system) via the in-vehicle communication bus.

The infrared camera 200 includes an objective lens, a shutter, and an infrared detector. The infrared detector is, for example, a microbolometer formed of amorphous silicon and detects infrared radiation at wavelengths of 8 to 14 micrometers, which is typically referred to as far-infrared radiation. The infrared detector converts infrared radiation received through the objective lens into an electric signal and outputs the converted electric signal in the form of a thermal image. The infrared detector, for example, outputs a thermal image composed of 320×240 pixels. The infrared camera 200 outputs, for example, 30 frames of thermal images per second. The infrared camera 200 is installed, for example, at an orientation that allows the infrared camera 200 to output thermal images of the outside of the host vehicle in the traveling direction of the host vehicle. In the examples described hereinafter, the traveling direction of the host vehicle is assumed to be a frontward direction.

The display device 201 is, for example, a liquid-crystal display device, a head-up display, or the like. The display device 201 receives an image signal output from the infrared camera 200 and displays the received image signal. In addition, the display device 201 receives an image signal output from the thermal image processing device 100 and displays the received image signal.

The voice output device 202 is, for example, a speaker, a buzzer, or the like. The voice output device 202 receives a voice signal output from the thermal image processing device 100 and outputs the received voice signal.

The thermal image processing device 100 includes a thermal image acquiring unit 101, an object detecting unit 102, a positional relationship calculating unit 103, an alert signal output unit 104, a control unit 105, and a determining unit 106. A hardware configuration of the thermal image processing device 100 is implemented by a combination of a general-purpose arithmetic unit, such as a CPU (central processing unit), and a storage device, such as a ROM (read-only memory) or a RAM (random-access memory).

The thermal image acquiring unit 101 acquires a thermal image signal output from the infrared camera 200. In addition, the thermal image acquiring unit 101 outputs the acquired thermal image to the object detecting unit 102 on the frame-by-frame basis.

The object detecting unit 102 detects a human or an object such as an oncoming vehicle from a thermal image received from the thermal image acquiring unit 101. A variety of techniques for detecting an object from an image signal are known. Thus, detailed descriptions thereof will be omitted herein, and a brief overview will be given. The object detecting unit 102 calculates a luminance gradient in each pixel of a thermal image, compares the feature of the luminance gradient against prestored data, and determines whether a human or the like is detected, for example. The object detecting unit 102 carries out such processing on each frame of a thermal image. The object detecting unit 102 outputs information on the result of such processing to the positional relationship calculating unit 103.

The positional relationship calculating unit 103 calculates a positional relationship between a detected object and the host vehicle and a change in this positional relationship on the basis of information received from the object detecting unit 102. For example, the positional relationship calculating unit 103 obtains a time to collision (TTC) from the position, the moving direction, and the moving speed of the detected object, the speed of the host vehicle, and so on. The positional relationship calculating unit 103 can also calculate the possibility of collision between the detected object and the host vehicle on the basis of the TTC. In that case, the positional relationship calculating unit 103 calculates the possibility of collision, for example, by multiplying the TTC by a prestored variable. Furthermore, the positional relationship calculating unit 103 can set an alert region in a thermal image. In that case, the positional relationship calculating unit 103 calculates whether a detected object is present in the alert region.

The alert signal output unit 104 outputs a predetermined alert signal to the display device 201 or the voice output device 202 for a predetermined duration when the possibility of collision between the detected object and the host vehicle is higher than a predetermined value as determined on the basis of the result calculated by the positional relationship calculating unit 103. Thus, the alert signal output unit 104 notifies the driver of or alerts the driver to the possibility that the host vehicle may collide with the detected object.

The control unit 105 is coupled to each functional block described above and the determining unit 106. The control unit 105 is further coupled to a counter (not illustrated) and a temperature sensor (not illustrated). The control unit 105 controls each functional block. When the counter has determined that a predetermined time has passed, the control unit 105 outputs a trigger instructing that the infrared detector be calibrated. In addition, when the temperature sensor has detected a change exceeding a predetermined temperature, the control unit 105 outputs a trigger instructing that the infrared detector be calibrated. The control unit 105 further includes a storage unit (not illustrated). The storage unit is a volatile random-access memory, a nonvolatile flash memory, or the like.

Next, the determining unit 106 will be described. The determining unit 106 determines whether the thermal image processing device 100 is to calibrate the infrared detector.

The following is an example of a method for calibrating an infrared detector. First, the infrared camera 200 closes a shutter embedded therein. Then, the infrared detector acquires a thermal image while the shutter is being closed. In other words, the infrared detector acquires a thermal image of the shutter's surface where the temperature distribution is uniform. Next, on the basis of the captured thermal image, a calibration processing unit (not illustrated) carries out correction processing by adding an offset value to an output value of the infrared camera 200 so that the output values of the pixels become uniform. When such calibration processing is carried out, the infrared camera 200 closes the shutter for a predetermined time. Thus, while the shutter is being closed, the infrared camera 200 is kept from acquiring a thermal image of the outside of the vehicle.

Accordingly, the determining unit 106 determines whether to calibrate the infrared detector in consideration of that the shutter is to be closed while the infrared detector is calibrated and on the basis of the result calculated by the positional relationship calculating unit 103. In other words, the determining unit 106 determines not to calibrate the infrared detector when the determining unit 106 has determined that the safety of the host vehicle cannot be ensured if the shutter is closed for a predetermined time. To rephrase, the determining unit 106 determines to calibrate the infrared detector when the determining unit 106 has determined that the safety of the host vehicle can be ensured even if the shutter is closed for a predetermined time.

The vehicle-speed sensor 300 is a sensor or the like provided in the automobile. The vehicle-speed sensor 300 detects the speed of the automobile and outputs the detected speed value to the thermal image processing device 100 via the in-vehicle communication bus.

Figure 2:
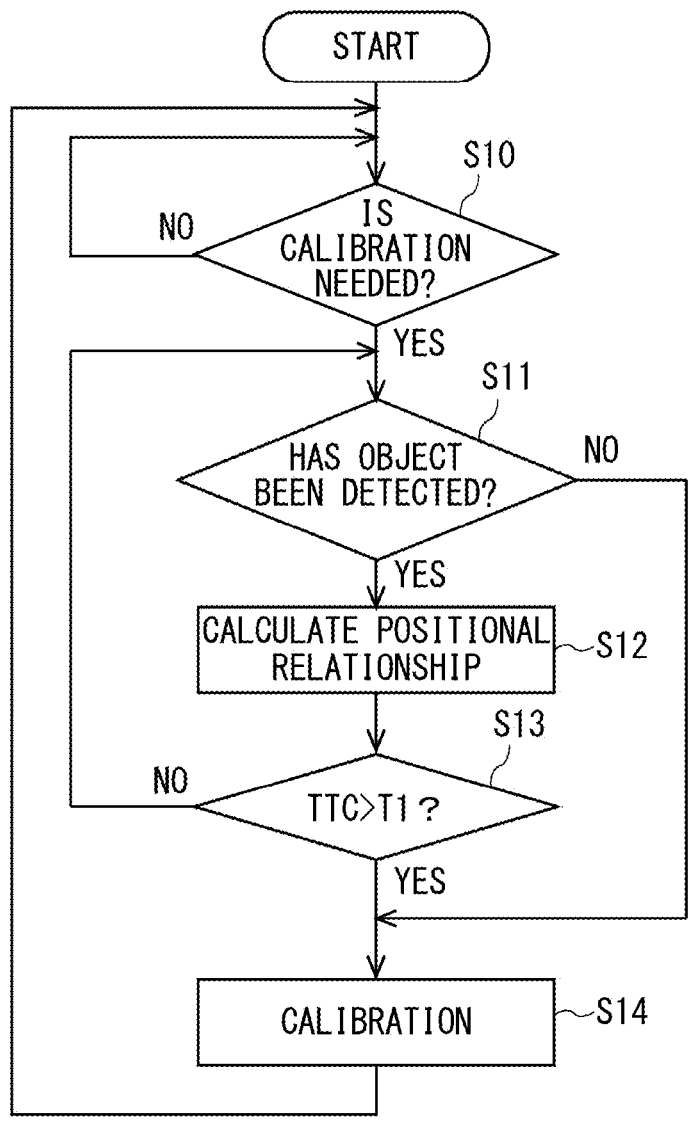
FIG. 2 is a flowchart of a thermal image processing method according to the first embodiment.
Figure 3:
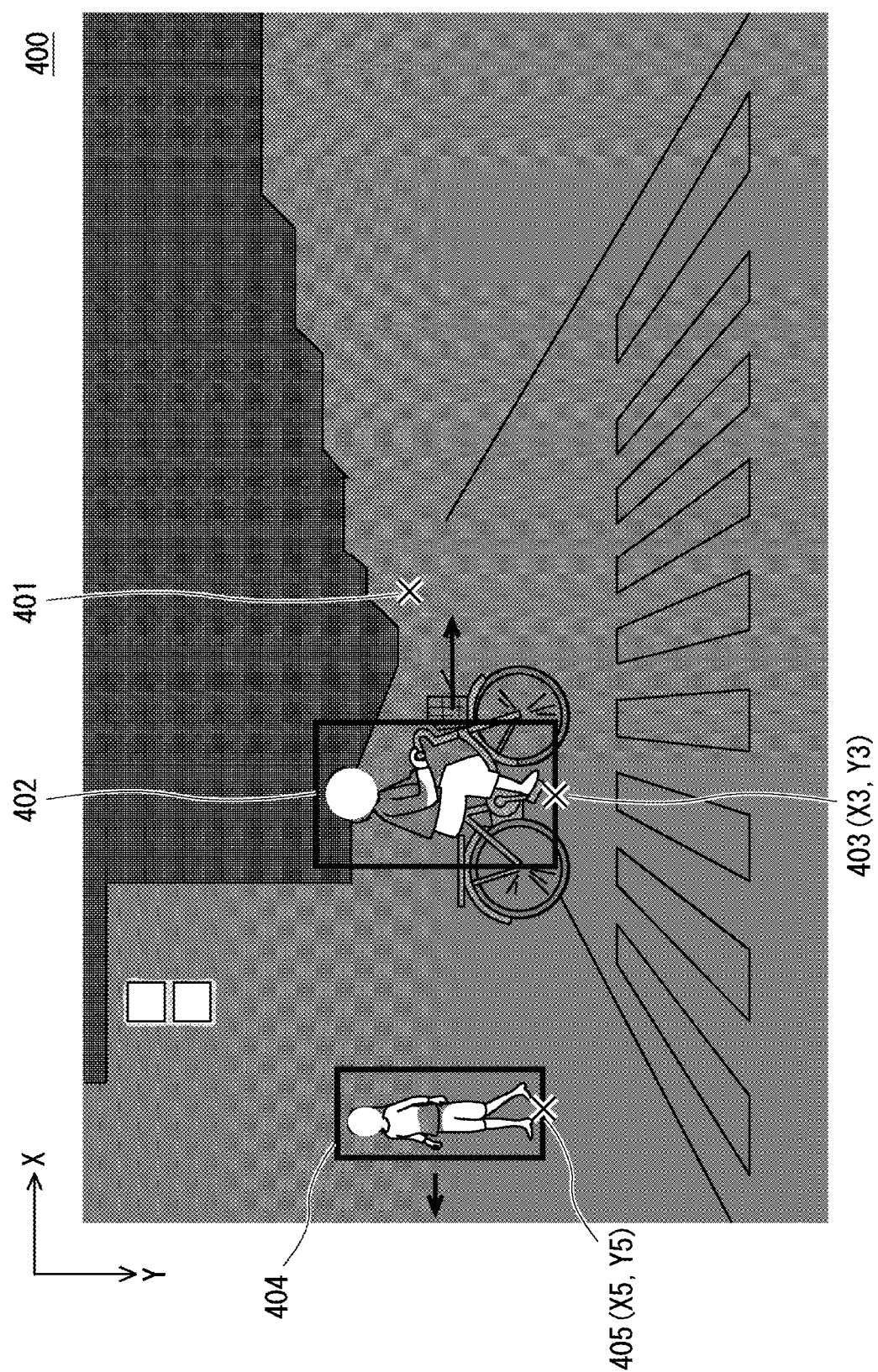
FIG. 3 is an illustration for describing processing of the thermal image processing device 100 according to the first embodiment.

Next, processing of the thermal image processing device 100 will be described with reference to FIGS. 2 and 3. FIG. 2 is a flowchart of a thermal image processing method according to the first embodiment.

The premise of this flowchart is that the thermal image processing device 100 is in operation and the infrared camera 200 is continuously outputting thermal images of the outside of the vehicle. In addition, humans and objects such as other vehicles are continuously being detected from the thermal images of the outside of the host vehicle output from the infrared camera 200. First, the control unit 105 determines whether the infrared detector needs to be calibrated (step S10). Specifically, for example, the control unit 105 determines whether a predetermined time Tm0 has passed since the thermal image processing device 100 has been started or whether the predetermined time Tm0 has passed since the last instance of calibration processing. Alternatively, the control unit 105 monitors, with a thermometer (not illustrated), a change in the temperature in the vicinity of the infrared detector and determines whether there has been a change exceeding a predetermined temperature ΔTp0 since the thermal image processing device 100 has been started or whether there has been a change exceeding the predetermined temperature ΔTp0 since the last instance of calibration processing.

In the case of the example described above and if the predetermined temperature ΔTp0 has not passed or if there has been no change exceeding the predetermined temperature ΔTp0 (step S10: NO), the control unit 105 determines again whether the infrared detector needs to be calibrated while allowing the infrared camera 200 to continue to output thermal images of the outside of the host vehicle. Meanwhile, if the predetermined time Tm0 has passed or if there has been a change exceeding the predetermined temperature ΔTp0, that is, if the control unit 105 has determined that the infrared detector needs to be calibrated (step S10: YES), the control unit 105 proceeds to the next step.

If the control unit 105 has determined that the infrared detector needs to be calibrated (step S10: YES), the object detecting unit 102 determines whether any object has been detected from the thermal images acquired by the thermal image acquiring unit 101 (step S11). If the object detecting unit 102 detects no object in the thermal images (step S11: NO), there is no possibility that the host vehicle collides with an object even if the shutter is closed to calibrate the infrared detector. In this case, the thermal image processing device 100 calibrates the infrared detector (step S14). Meanwhile, if the object detecting unit 102 has detected an object in the thermal images (step S11: YES), it cannot be determined immediately that the shutter may be closed to calibrate the infrared detector. In this case, the object detecting unit 102 outputs information on the detected object to the positional relationship calculating unit 103.

Then, the positional relationship calculating unit 103 calculates the positional relationship between the host vehicle and the object detected by the object detecting unit 102 (step S12). The determining unit 106 determines whether to calibrate the infrared detector on the basis of the result calculated by the positional relationship calculating unit 103 (step S13). Specifically, the determining unit 106 determines whether the TTC of the detected object is greater than a predetermined value.

A specific example will be described with reference to FIG. 3. FIG. 3 is an illustration for describing processing of the thermal image processing device 100 according to the first embodiment. A thermal image 400 illustrated in FIG. 3 is a thermal image acquired by the infrared camera 200 and simplified to facilitate the description. In the thermal image 400, a portion with a higher temperature is displayed relatively lighter, and a portion with a lower temperature is displayed relatively darker. To facilitate the description, the thermal image 400 illustrated in FIG. 3 has its origin lying at the top left of the screen, the X-axis is set in the horizontal direction, and the positive direction along the X-axis extends from the left toward the right. In a similar manner, the thermal image 400 illustrated in FIG. 3 has its origin lying at the top left, the Y-axis is set along the vertical direction, and the positive direction along the Y-axis extends from the top toward the bottom.

The object detecting unit 102 detects an object 402 and an object 404 from the thermal image 400 acquired by the thermal image acquiring unit 101. The infrared camera 200 that acquires the thermal image 400 is so installed as to be oriented in a predetermined direction at a predetermined position in the automobile. In the case of the example illustrated in FIG. 3, the infrared camera 200 is so installed as to capture an image of a space in the traveling direction of the host vehicle. The lower edge of the thermal image 400, that is, the edge portion in the positive direction along the Y-axis contains an image of a region closest to the host vehicle. A point 401 is the vanishing point or the infinity of the thermal image 400. The positional relationship calculating unit 103 calculates the positional relationship of each of the object 402 and the object 402 detected in the thermal image 400 as, for example, the positional relationship between the host vehicle and the object 402 or the object 404 in an actual three-dimensional space on the basis of the two-dimensional position in the thermal image 400.

For example, the positional relationship calculating unit 103 calculates the positional relationship between the host vehicle and the object 402 on the basis of the coordinates (X3,Y3) of a point 403 on a lower portion of the object 402. In a similar manner, the positional relationship calculating unit 103 calculates the positional relationship between the host vehicle and the object 404 on the basis of the coordinates (X5,Y5) of a point 405 on a lower portion of the object 404. The positional relationship calculating unit 103 may calculate the positional relationship between an object detected in the thermal image 400 and the host vehicle, for example, on the basis of a video image acquired by a visible light camera (not illustrated). In addition, a millimeter-wave radar or the like may be used in combination.

Thereafter, the positional relationship calculating unit 103 calculates the moving directions and the moving speeds of the object 402 and the object 404 from the thermal image 400 and another thermal image acquired prior to the thermal image 400. In addition, the positional relationship calculating unit 103 calculates the TTCs of the object 402 and the object 404 from the calculated positions, moving directions, and moving speeds of the object 402 and the object 404 and the speed of the host vehicle acquired via the in-vehicle communication bus.

Next, the determining unit 106 acquires the TTCs of the object 402 and the object 404 calculated by the positional relationship calculating unit 103. Then, the determining unit 106 determines whether to calibrate the infrared detector. In the case of the example illustrated in FIG. 3, the determining unit 106 determines whether the TTCs of the object 402 and the object 404 are greater than a predetermined value T1 (step S13 of FIG. 2).

Referring back to the flowchart illustrated in FIG. 2, the description continues. If the determining unit 106 has failed to determine that the TTC of the detected object is greater than the predetermined value T1 (step S13: NO), the possibility of collision between the detected object and the host vehicle is higher than a predetermined value. In other words, if the infrared detector starts being calibrated at this timing, it is highly likely that the driver cannot be alerted at an appropriate timing before the calibration processing finishes when the detected object has further approached the host vehicle. Therefore, the thermal image processing device 100 doesn't calibrate the infrared detector. Then, the thermal image processing device 100 returns again to the determination (step S11) as to whether any object is detected while allowing the infrared camera 200 to continue to output thermal images of the outside of the host vehicle. The object to be subjected to the determination in this case may be an object different from the object for which the TTC has been determined not being greater than the predetermined value T1 in the processing of step S13.

Meanwhile, if the determining unit 106 has determined that the TTC of the detected object is greater than the predetermined value T1 (step S13: YES), the possibility of collision between the detected object and the host vehicle is lower than a predetermined value. In other words, if the infrared detector starts being calibrated at this timing, it is unlikely that the driver is alerted before the calibration processing finishes even when the detected object has further approached the host vehicle. Therefore, the thermal image processing device 100 calibrates the infrared detector (step S14).

In the specific example described with reference to FIG. 3, the object 402 is moving in front of the host vehicle in the direction of an arrow, that is, in the positive direction along the X-axis. The positional relationship calculating unit 103 calculates the TTC of the object 402 on the basis of the position, the moving direction, and the moving speed of the object 402 in the thermal image 400 and the speed of the host vehicle. If the determining unit 106 has determined that the TTC of the object 402 is greater than the predetermined value T1, the thermal image processing device 100 calibrates the infrared detector. Meanwhile, if the determining unit 106 has determined that the TTC of the object 402 is not greater than the predetermined value T1, the thermal image processing device 100 doesn't calibrate the infrared detector. Similar processing is carried out with respect to the object 404 as well.

As another example aside from the processing described above, the positional relationship calculating unit 103 can set an alert region in the thermal image 400. In that case, the positional relationship calculating unit 103 calculates whether the object 402 and the object 404 will be present in the stated alert region within a predetermined time on the basis of the positions, the moving directions, and the moving speeds of the object 402 and the object 404 and the speed of the host vehicle. Then, if the object 402 and the object 404 will be present in the alert region within the predetermined time, the determining unit 106 doesn't calibrate the infrared detector. Meanwhile, if the object 402 and the object 404 will not be present in the alert region within the predetermined time, the determining unit 106 calibrates the infrared detector.

When the possibility of collision between the object 402 and the host vehicle has further increased, that is, when the TTC of the object 402 has further decreased, the alert signal output unit 104 alerts the driver to a high possibility of collision.

Such a configuration allows the thermal image processing device 100 to calibrate the infrared detector at an appropriate timing in accordance with the movement of a human or an object detected in an acquired thermal image.

Second Embodiment

Next, a second embodiment will be described. Functional blocks according to the second embodiment are the same as those of the first embodiment. Therefore, descriptions of functions and processing that are common therebetween will be omitted as appropriate. The second embodiment differs in terms of processing carried out when the driver is alerted if the possibility of collision with an object is higher than a predetermined value.

A specific example will be described with reference to FIG. 3. In the thermal image 400 illustrated in FIG. 3, the object 402 is passing in front of the host vehicle. When the TTC of the object 402 is not greater than the predetermined value T1 and when the TTC is smaller than a predetermined value T2, there is a chance that the host vehicle may collide with the object 402. Therefore, the thermal image processing device 100 alerts the driver. Such an alert is continued for a predetermined duration. While the driver is being alerted, an alert display for informing the driver of the danger can be provided in place of the image illustrated in FIG. 3. Thus, there is a case in which the infrared detector can be calibrated while such an alert display is being provided.

Figure 4:
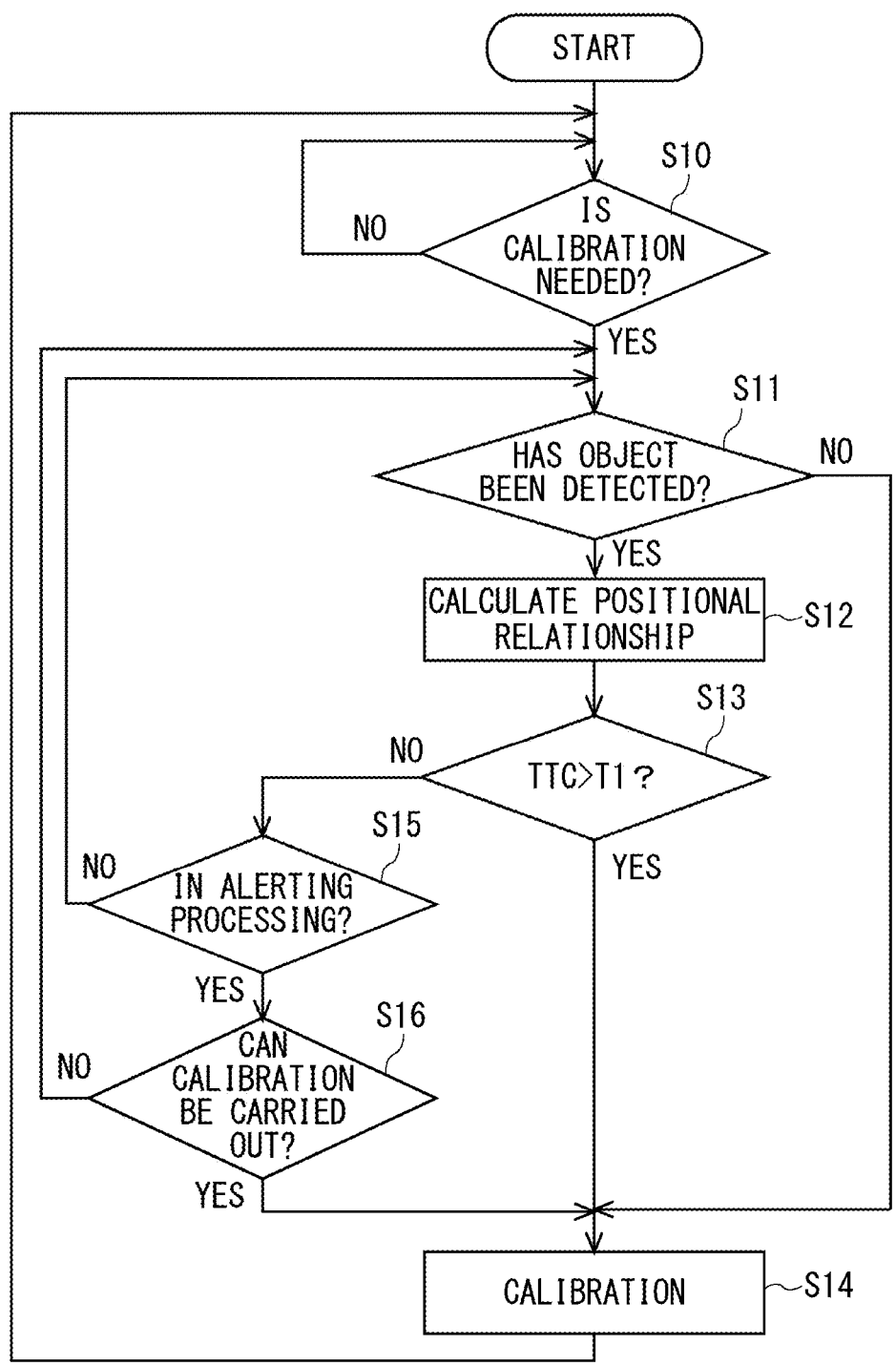
FIG. 4 is a flowchart of a thermal image processing method according to a second embodiment.

Processing according to the second embodiment will be described with reference to FIG. 4. FIG. 4 is a flowchart of a thermal image processing method according to the second embodiment. The flowchart illustrated in FIG. 4 differs from the flowchart illustrated in FIG. 2 in that step S15 and step S16 are added.

The determining unit 106 compares the TTC of the object calculated by the positional relationship calculating unit 103 against the predetermined value T1 (step S13). If the determining unit 106 has failed to determine that the TTC is greater than the predetermined value T1 (step S13: NO), the determining unit 106 determines whether the alert signal output unit 104 is carrying out alerting processing by referring to the state of the alert signal output unit 104 (step S15).

If the determining unit 106 has failed to determine that the state of the alert signal output unit 104 indicates that alert signal output unit 104 is in the alerting processing (step S15: NO), the thermal image processing device 100 returns to step S11. Meanwhile, if the determining unit 106 has determined that the state of the alert signal output unit 104 indicates that the alert signal output unit 104 is in the alerting processing (step S15: YES), the determining unit 106 then determines whether the infrared detector can be calibrated within a duration in which the alerting processing is finished (step S16). If the determining unit 106 has failed to determine that the infrared detector can be calibrated within the duration in which the alerting processing is finished (step S16: NO), the thermal image processing device 100 returns to step S11. Meanwhile, if the determining unit 106 has determined that the infrared detector can be calibrated within the duration in which the alerting processing is finished (step S16: YES), the thermal image processing device 100 calibrates the infrared detector (step S14).

Carrying out such processing allows the thermal image processing device 100 to calibrate the infrared detector at a timing that does not reduce the reliability.

Third Embodiment

Next, a third embodiment will be described. Functional blocks according to the third embodiment are the same as those of the first and second embodiments. Therefore, descriptions of functions and processing that are common therebetween will be omitted as appropriate. The third embodiment differs from the second embodiment in that processing of mandatorily calibrating an infrared detector is added.

Figure 5:
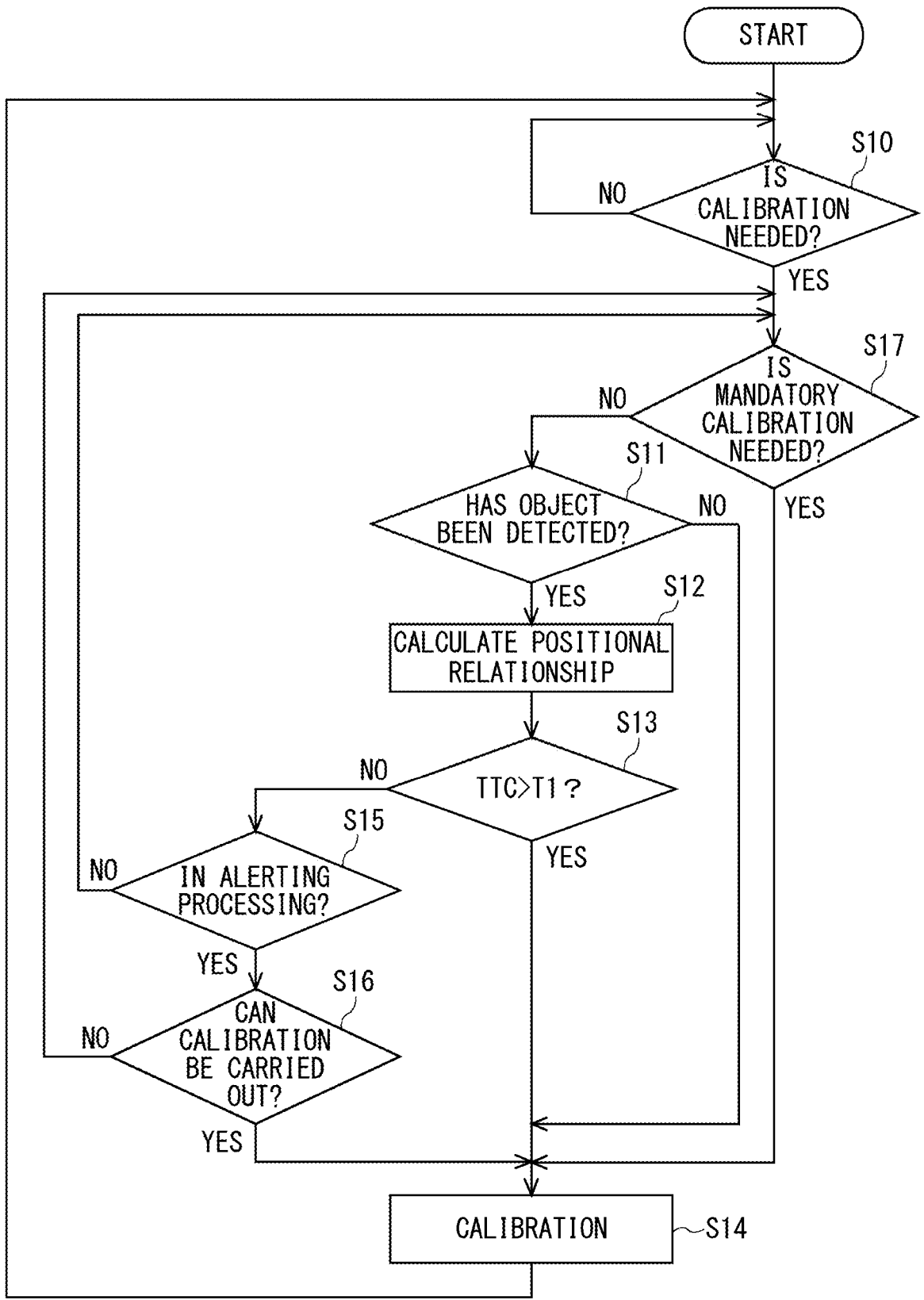
FIG. 5 is a flowchart of a thermal image processing method according to a third embodiment.

Processing according to the third embodiment will be described with reference to FIG. 5. FIG. 5 is a flowchart of a thermal image processing method according to the third embodiment. The flowchart illustrated in FIG. 5 differs from the flowchart illustrated in FIG. 4 in that step S17 is added. Step S17 will be described below.

If the determining unit 106 has determined in step S10 that calibration processing is to be carried out (step S10: YES), the determining unit 106 then determines whether the calibration processing needs to be carried out mandatorily (step S17).

Specifically, the determining unit 106 determines, for example, whether a predetermined time Tm1 has passed since the thermal image processing device 100 has carried out the calibration processing last time. Herein, the time Tm1 corresponds to a maximum duration in which the reliability of the thermal image processing device 100 could noticeably decrease unless the calibration processing is carried out, and the time Tm1 is longer than the time Tm0 described above. In a case in which the output signal of the infrared detector used in the thermal image processing device 100 deteriorates over time, such processing is effective.

The determining unit 106 can monitor, with a temperature sensor (not illustrated), a change in the temperature in the vicinity of the infrared detector and determine whether there has been a change exceeding a predetermined temperature ΔTp1 since the last instance of the calibration processing. Herein, the temperature ΔTp1 corresponds to a maximum temperature at which the reliability of the thermal image processing device 100 could noticeably decrease unless the calibration processing is carried out, and the temperature ΔTp1 is greater than the temperature ΔTp0 described above. In a case in which the output signal of the infrared detector used in the thermal image processing device 100 deteriorates along with a change in the temperature, such processing is effective.

If the determining unit 106 has failed to determine in step S17 that the calibration processing needs to be carried out mandatorily (step S17: NO), the thermal image processing device 100 proceeds to step S11. Meanwhile, if the determining unit 106 has determined that the calibration processing needs to be carried out mandatorily (step S17: YES), the thermal image processing device 100 calibrates the infrared detector regardless of the condition of the thermal image, that is, regardless of the positional relationship between the host vehicle and the object present in front of the host vehicle (step S14).

Carrying out such processing allows the thermal image processing device 100 to keep the thermal images from deteriorating.

Fourth Embodiment

Next, a fourth embodiment will be described. Functional blocks of the fourth embodiment differ from those of the first to third embodiments in terms of the configuration of the infrared camera 200. Therefore, descriptions of functions and processing that are common therebetween will be omitted as appropriate.

The fourth embodiment will be described with reference to FIG. 6. FIG. 6 is a functional block diagram of an infrared imaging apparatus 120 according to the fourth embodiment. The infrared imaging apparatus 120 includes the infrared camera 200 in addition to the components of the thermal image processing device 100 described in the first to third embodiments.

Employing such a configuration makes it possible to provide an infrared imaging apparatus that calibrates an infrared detector at an appropriate timing.

It is to be noted that the present invention is not limited to the embodiments described above, and modifications can be made as appropriate within the scope that does not depart from the technical spirit. For example, the components of the thermal image processing device 100 are not limited by the content described above, and the determining unit 106 may be included in the control unit 105. Alternatively, the processing carried out by the positional relationship calculating unit 103 may be carried out by the determining unit 106. The thermal image processing device does not need to be unitary and may be in a distributed and interconnected state.

INDUSTRIAL APPLICABILITY

As described thus far, the thermal image processing device according to the present embodiments can be used as an image display device implemented, for example, in a vehicle.

What is claimed is:

1. A thermal image processing device, comprising:
 a storage device storing a thermal image processing program; and
 a central processing unit (CPU) communicatively coupled to the storage device, the CPU configured to execute the program to:
  output a trigger instructing that an infrared detector provided in a vehicle be calibrated;
  acquire a thermal image detected by the infrared detector;
  detect an object from the thermal image;
  calculate a possibility of collision between the object and the vehicle from a positional relationship between the detected object and the vehicle;
  determine whether to calibrate the infrared detector on the basis of the possibility of the collision between the object and the vehicle; and
  determine not to calibrate if the possibility of the collision between the object and the vehicle is higher than a predetermined value regardless of an output of the trigger and determine that the calibration can be carried out if the possibility of the collision between the object and the vehicle is lower than the predetermined value.

2. The thermal image processing device according to claim 1, wherein the CPU is further configured to execute the program to:
 calculate a time to collision on the basis of the positional relationship, the time to collision being a time in which the object and the vehicle will collide with each other, and
 determine not to calibrate if the time to collision is no greater than a predetermined value.

3. The thermal image processing device according to claim 1, wherein the CPU is configured to execute the program to:
 output an alert signal for a predetermined duration if the possibility of the collision calculated by the positional relationship calculating unit is high, and
 determine whether the calibration will finish before the predetermined duration in which the alert signal is being output ends and determine that the calibration can be carried out if the calibration will finish.

4. The thermal image processing device according to claim 1, further comprising:
 a temperature sensor configured to detect a change in a temperature,
 wherein the CPU is further configured to execute the program to determine that the infrared detector needs to be calibrated mandatorily regardless of the positional relationship if the change in the temperature detected by the temperature sensor has exceeded a predetermined range within a predetermined duration.

5. An infrared imaging apparatus, comprising:
 the thermal image processing device according to claim 1; and
 the infrared detector.

6. A thermal image processing method, comprising:
 outputting a trigger instructing that an infrared detector provided in a vehicle be calibrated;
 acquiring a thermal image detected by the infrared detector;
 detecting an object from the thermal image;
 calculating a possibility of collision between the object and the vehicle from a positional relationship between the detected object and the vehicle; and
 determining whether to calibrate the infrared detector on the basis of the possibility of the collision between the object and the vehicle,
 wherein, in the determining, it is determined not to calibrate if the possibility of the collision between the object and the vehicle is higher than a predetermined value regardless of an output of the trigger and determined that the calibration can be carried out if the possibility of the collision between the object and the vehicle is lower than the predetermined value.

7. A non-transitory computer readable medium storing a thermal image processing program that causes a computer to execute:
 a procedure of outputting a trigger instructing that an infrared detector provided in a vehicle be calibrated;
 a procedure of acquiring a thermal image detected by the infrared detector;
 a procedure of detecting an object from the thermal image;
 a procedure of calculating a possibility of collision between the object and the vehicle from a positional relationship between the detected object and the vehicle; and
 a procedure of determining whether to calibrate the infrared detector on the basis of the possibility of the collision between the object and the vehicle,
 wherein, in the procedure of determining, it is determined not to calibrate if the possibility of the collision between the object and the vehicle is higher than a predetermined value regardless of an output of the trigger and determined that the calibration can be carried out if the possibility of the collision between the object and the vehicle is lower than the predetermined value.

* * * * *